(12) United States Patent
Schwendenmann et al.

(10) Patent No.: US 11,970,972 B2
(45) Date of Patent: Apr. 30, 2024

(54) WINDAGE BLOCKER FOR OIL ROUTING

(71) Applicant: United Technologies Corporation, Farmington, CT (US)

(72) Inventors: Andrew V. Schwendenmann, Hampden, MA (US); Todd A. Davis, Tolland, CT (US); Ryan Lureau, Manchester, CT (US); Reade W. James, West Hartford, CT (US)

(73) Assignee: RTX Corporation, Farmington, CT (US)

( * ) Notice: Subject to any disclaimer, the term of this patent is extended or adjusted under 35 U.S.C. 154(b) by 1139 days.

(21) Appl. No.: 16/661,459

(22) Filed: Oct. 23, 2019

(65) Prior Publication Data

US 2021/0123385 A1    Apr. 29, 2021

(51) Int. Cl.
*F02C 7/06* (2006.01)
*F16C 33/66* (2006.01)

(52) U.S. Cl.
CPC ............ *F02C 7/06* (2013.01); *F16C 33/6685* (2013.01); *F05D 2220/32* (2013.01); *F05D 2240/50* (2013.01); *F05D 2260/98* (2013.01); *F16C 2360/23* (2013.01)

(58) Field of Classification Search
CPC .............. F01D 25/18; F05D 2260/602; F16C 33/6685; F16C 2360/23
See application file for complete search history.

(56) References Cited

U.S. PATENT DOCUMENTS

| 4,862,995 | A |   | 9/1989  | Faria |
|---|---|---|---|---|
| 5,261,751 | A | * | 11/1993 | Heinz ............... F16C 33/6685 384/466 |
| 5,813,493 | A |   | 9/1998  | Sloan et al. |
| 6,199,543 | B1|   | 3/2001  | Bedkowski |
| 7,017,546 | B1|   | 3/2006  | Patel et al. |
| 7,878,303 | B2| * | 2/2011  | Munson .................. F02C 7/06 384/473 |

(Continued)

FOREIGN PATENT DOCUMENTS

| CN | 201241753 Y | 5/2009 |
|---|---|---|
| CN | 203463452 U | 3/2014 |

(Continued)

OTHER PUBLICATIONS

EP Search Report dated Mar. 3, 2021 issued for corresponding European Patent Application No. 20202903.9.

(Continued)

*Primary Examiner* — Justin D Seabe
*Assistant Examiner* — Aye S Htay
(74) *Attorney, Agent, or Firm* — Bachman & LaPointe, P.C.

(57) ABSTRACT

A scupper suitable for a bearing compartment of a gas turbine engine includes a windage blocker in a gutter section upstream of a drain hole, the windage blocker extends from a wall of the gutter section. A method for capturing wept oil in a bearing compartment of a gas turbine engine includes positioning a windage blocker adjacent to a drain hole forming a passage space and increasing a pressure upstream of the windage blocker to generate a vortex downstream of the windage blocker creating an oil re-circulation zone promoting oil drainage into the drain hole.

17 Claims, 7 Drawing Sheets

(56) References Cited

U.S. PATENT DOCUMENTS

| | | | |
|---|---|---|---|
| 8,500,869 B1 | 8/2013 | Johnson et al. | |
| 8,621,839 B2 | 1/2014 | Alecu et al. | |
| 9,341,117 B2 | 5/2016 | Remer et al. | |
| 9,650,957 B2 | 5/2017 | Cutrara et al. | |
| 9,850,779 B2 * | 12/2017 | Gatto | F02C 7/06 |
| 10,100,735 B2 | 10/2018 | Craig | |
| 10,287,915 B2 | 5/2019 | McCune | |
| 11,162,421 B2 * | 11/2021 | Dick | F16N 7/32 |
| 2005/0132710 A1 * | 6/2005 | Peters | F01D 25/18 |
| | | | 60/772 |
| 2006/0002645 A1 * | 1/2006 | Swainson | F16C 33/10 |
| | | | 384/462 |
| 2008/0078617 A1 * | 4/2008 | Glahn | F01D 25/186 |
| | | | 184/6 |
| 2008/0110813 A1 * | 5/2008 | Munson | F01D 25/20 |
| | | | 210/167.04 |
| 2008/0190091 A1 | 8/2008 | Peters et al. | |
| 2008/0245614 A1 | 10/2008 | Matucheski | |
| 2010/0058729 A1 * | 3/2010 | Fomison | F01D 25/18 |
| | | | 60/39.08 |
| 2012/0324899 A1 | 12/2012 | Dibenedetto et al. | |
| 2015/0176492 A1 | 6/2015 | Cutrara et al. | |
| 2016/0017812 A1 | 1/2016 | Sheridan | |
| 2016/0356179 A1 | 12/2016 | Tennevall et al. | |
| 2019/0323382 A1 | 10/2019 | Pankratov | |
| 2021/0071677 A1 | 3/2021 | Schwendenmann et al. | |
| 2021/0123361 A1 * | 4/2021 | Davis | F01D 25/18 |

FOREIGN PATENT DOCUMENTS

| | | |
|---|---|---|
| CN | 203730508 U | 7/2014 |
| CN | 207750348 U | 8/2018 |
| FR | 2000665 A1 | 9/1969 |
| FR | 3037614 A1 | 12/2016 |
| JP | 2001140654 A | 5/2001 |
| WO | 2018113332 A1 | 6/2018 |
| WO | 2019147778 A1 | 8/2019 |

OTHER PUBLICATIONS

U.S. Non-Final Office action dated Feb. 4, 2022 issued for related U.S. Appl. No. 16/572,806.

EP Search Report dated Mar. 5, 2021 issued for corresponding European Patent Application No. 20203444.3.

EP Search Report dated Feb. 9, 2021 issued for corresponding European Patent Application No. 20194406.3.

* cited by examiner

WINDAGE BLOCKER FOR OIL ROUTING

BACKGROUND

The present disclosure relates to an oil drainback system for a sealed bearing compartment of a gas turbine engine and, more particularly, to a windage blocking baffle for such an oil drainback system.

Gas turbine engines typically contain bearing compartments, or other wetted chambers. The bearing compartments contain oil and typically include dynamic seals with an air buffered cavity to retain the oil within the bearing compartment. Typically, seal systems are positioned to prevent the high temperature and pressure air from flowing into sensitive areas.

Loss of oil from the bearing compartments, at the location of the seals in particular, can have negative consequences to engine performance, durability, or operation. Oil that weeps through the seal system may also travel into the compressor system or turbine as bleeding into the compressor may lead to imbalance concerns or customer bleed contamination while bleeding into the turbine may lead to thermal operational effects.

SUMMARY

An oil drainback system suitable for a bearing compartment of a gas turbine engine according to one disclosed non-limiting embodiment of the present disclosure includes a scupper defined about an engine longitudinal axis; a gutter section formed in the scupper, the gutter section having a drain hole; and a windage blocker in the gutter section upstream of the drain hole, the windage blocker extends from a wall of the gutter section.

A further embodiment of any of the foregoing embodiments of the present disclosure includes that the windage blocker extends from a wall of the gutter section to define a passage space 25%-30% a total width of the gutter section.

A further embodiment of any of the foregoing embodiments of the present disclosure includes that the drain hole extends at least partially into the wall of the gutter section.

A further embodiment of any of the foregoing embodiments of the present disclosure includes that the windage blocker is upstream of the drain hole by a distance equivalent to a width of the windage blocker.

A further embodiment of any of the foregoing embodiments of the present disclosure includes that the windage blocker is upstream of the drain hole by 2-5 degrees of the 360 degree gutter section.

A further embodiment of any of the foregoing embodiments of the present disclosure includes that the windage blocker is a pin affixed within an aperture formed in the wall of the gutter section.

A further embodiment of any of the foregoing embodiments of the present disclosure includes that the windage blocker is machined in the wall of the gutter section.

A bearing compartment of a gas turbine engine according to one disclosed non-limiting embodiment of the present disclosure includes a scupper defined about an engine longitudinal axis; a gutter section formed in the scupper, the gutter section having a drain hole; a windage blocker in the gutter section upstream of the drain hole, the windage blocker extends from a wall of the gutter section; and an oil drain tube assembly in communication with the drain hole.

A further embodiment of any of the foregoing embodiments of the present disclosure includes that the scupper extends aft of a rear bearing of the bearing compartment.

A further embodiment of any of the foregoing embodiments of the present disclosure includes a seal assembly within the scupper.

A further embodiment of any of the foregoing embodiments of the present disclosure includes that the seal assembly is aft of the rear bearing.

A further embodiment of any of the foregoing embodiments of the present disclosure includes that the oil drain tube assembly is located at bottom dead center.

A further embodiment of any of the foregoing embodiments of the present disclosure includes that the windage blocker extends from a wall of the gutter section to define a passage space 25%-30% a total width of the gutter section.

A further embodiment of any of the foregoing embodiments of the present disclosure includes that the windage blocker is upstream of the drain hole by a distance equivalent to a width of the windage blocker.

A further embodiment of any of the foregoing embodiments of the present disclosure includes that the windage blocker is upstream of the drain hole by 2-5 degrees of the 360 degree gutter section.

A method for capturing wept oil in a bearing compartment of a gas turbine engine according to one disclosed non-limiting embodiment of the present disclosure includes positioning a windage blocker adjacent to a drain hole forming a passage space for increasing a pressure upstream of the windage blocker and generating a vortex downstream of the windage blocker so as to create an oil re-circulation zone promoting oil drainage into the drain hole.

A further embodiment of any of the foregoing embodiments of the present disclosure includes positioning the windage blocker to extend from a wall in a gutter section, the drain hole positioned at least partially on the wall.

A further embodiment of any of the foregoing embodiments of the present disclosure includes creating both a calming area for oil to pool and build head pressure for the oil to drain down the drain hole as well as a pumping action due to the direction of rotation of the recirculation zone.

A further embodiment of any of the foregoing embodiments of the present disclosure includes changing an oil concentration circumferentially around the gutter section due to the presence of the windage blocker.

The foregoing features and elements may be combined in various combinations without exclusivity, unless expressly indicated otherwise. These features and elements as well as the operation of the invention will become more apparent in light of the following description and the accompanying drawings. It should be appreciated; however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
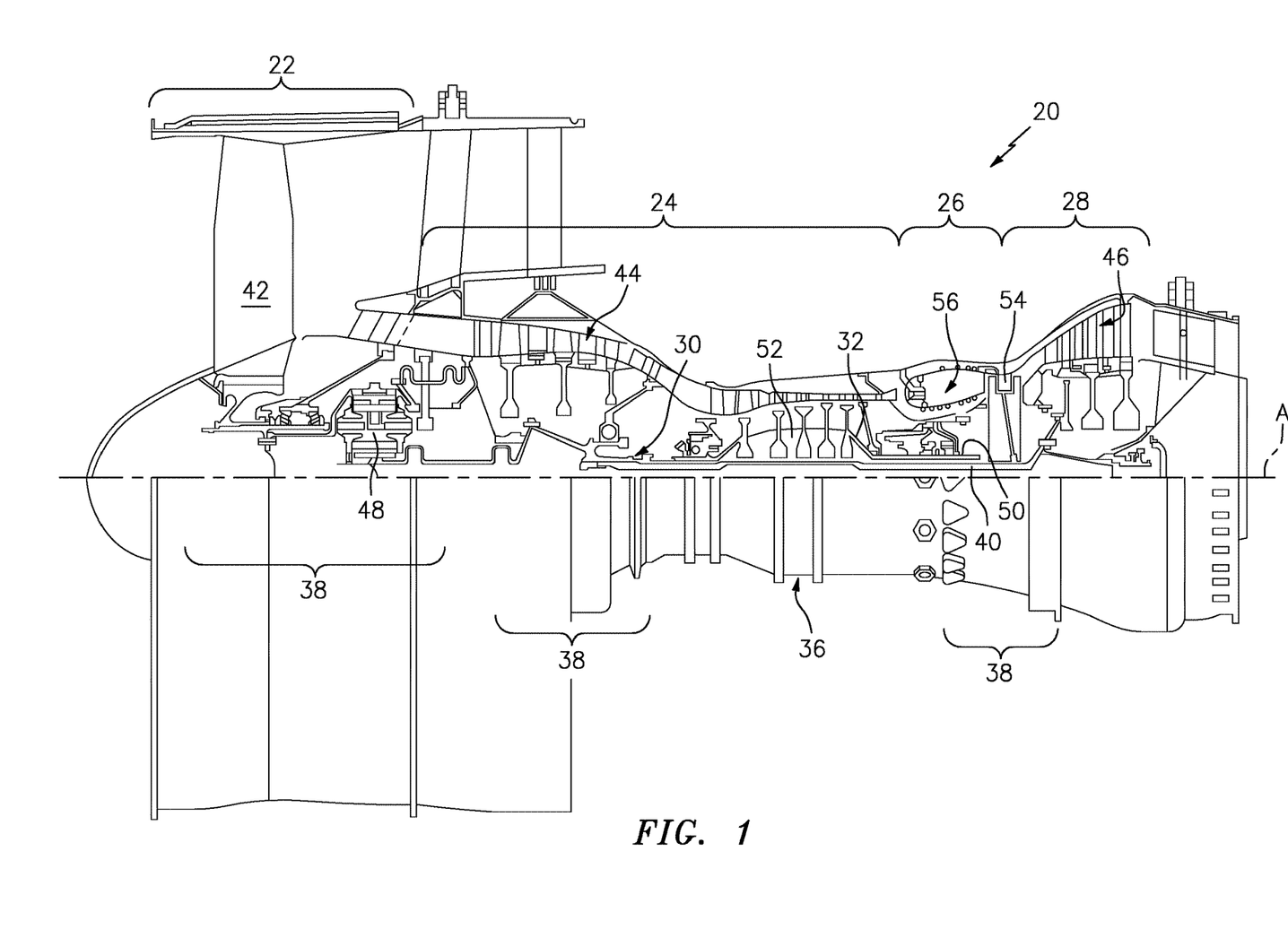
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine architectures might include an augmentor section and exhaust duct section among other systems or features.

The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engines such as a low bypass augmented turbofan, turbojets, turboshafts, and three-spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

The engine 20 generally includes a low spool 30 and a high spool 32 mounted for rotation about an engine central longitudinal axis A relative to an engine static structure 36 via several bearing compartments 38. The low spool 30 generally includes an inner shaft 40 that interconnects a fan 42, a low pressure compressor 44 ("LPC") and a low pressure turbine 46 ("LPT"). The inner shaft 40 drives the fan 42 directly or through a geared architecture 48 to drive the fan 42 at a lower speed than the low spool 30. An exemplary reduction transmission is an epicyclic transmission, namely a planetary or star gear system. The high spool 32 includes an outer shaft 50 that interconnects a high pressure compressor 52 ("HPC") and high pressure turbine 54 ("HPT"). A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44 then the HPC 52, mixed with fuel and burned in the combustor 56, then expanded over the HPT 54 and the LPT 46. The turbines 54, 46 rotationally drive the respective high spool 32 and low spool 30 in response to the expansion. The main engine shafts 40, 50 are supported at a plurality of points by respective bearing compartments 38.

Figure 2:
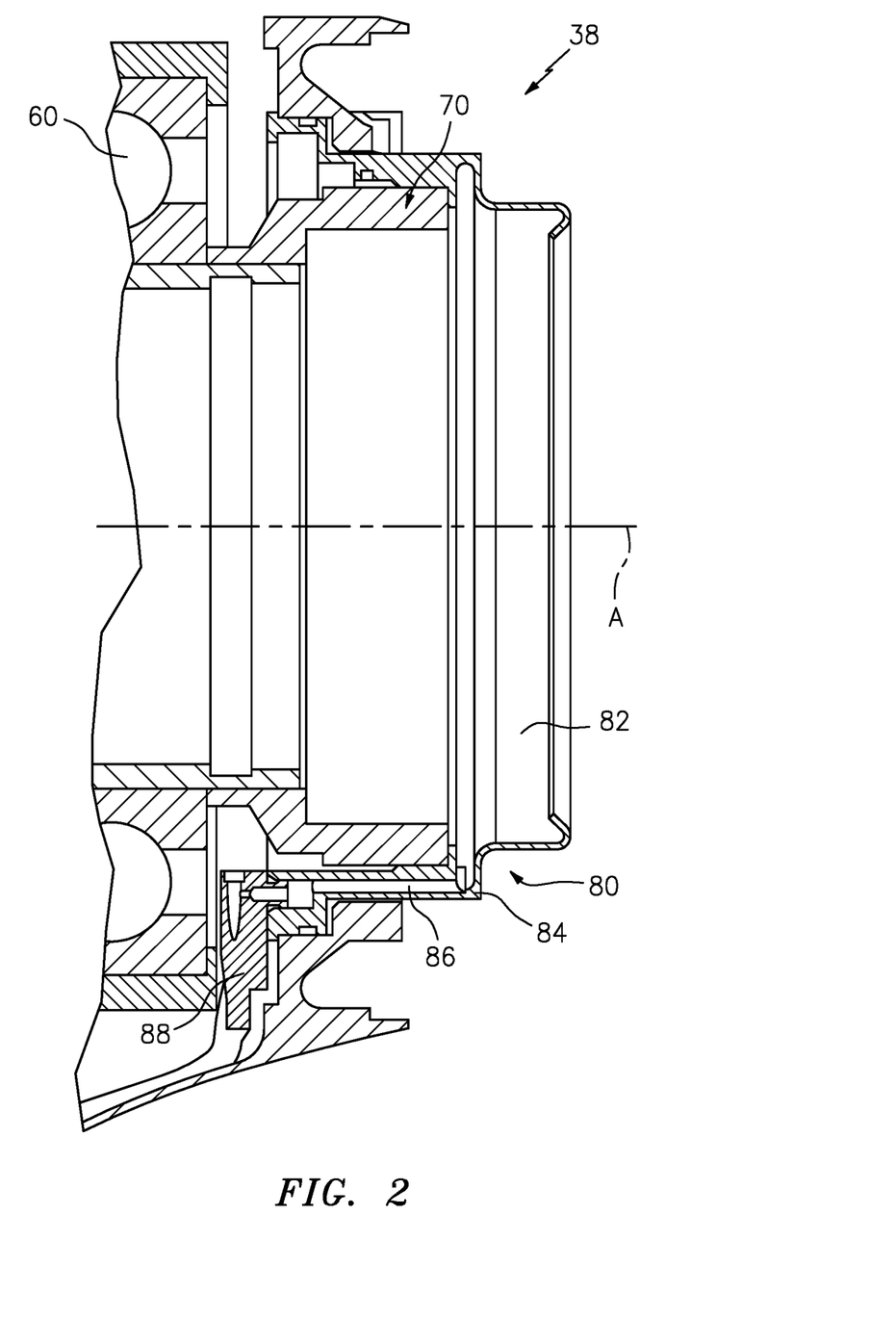
FIG. 2 is a sectional view of a bearing compartment with an oil drainback system.

With reference to FIG. 2, each of the multiple of bearing compartments 38 include one or more bearings 60 (one bearing of a bearing compartment illustrated schematically) and one or more seal system 70 (only the rear seal of the bearing compartment illustrated schematically). The bearing 60 and seal system 70 respectively support and interface with the shafts 40, 50 (FIG. 1) of the respective low spool 30 and high spool 32 along the engine central longitudinal axis A.

The seal system 70 can include carbon seals, mechanical seals, brush seals, etc. The seal system 70 operates to seal the bearing compartments 38, i.e., an oil-wetted zone from a dry zone. So, for example, the interior of each bearing compartment 38 may be referred to as the oil-wetted zone while the region external thereto may be referred to as the dry zone. The bearings 60 support the low spool 30 and the high spool 32 and the seal system 70 separate the oil-wetted zone from the dry zone to define the boundaries of each bearing compartment 38. Although particular bearing compartments and bearing arrangements are illustrated in the disclosed non-limiting embodiment, other bearing compartments and bearing arrangements in other engine architectures will also benefit herefrom.

Figure 3:
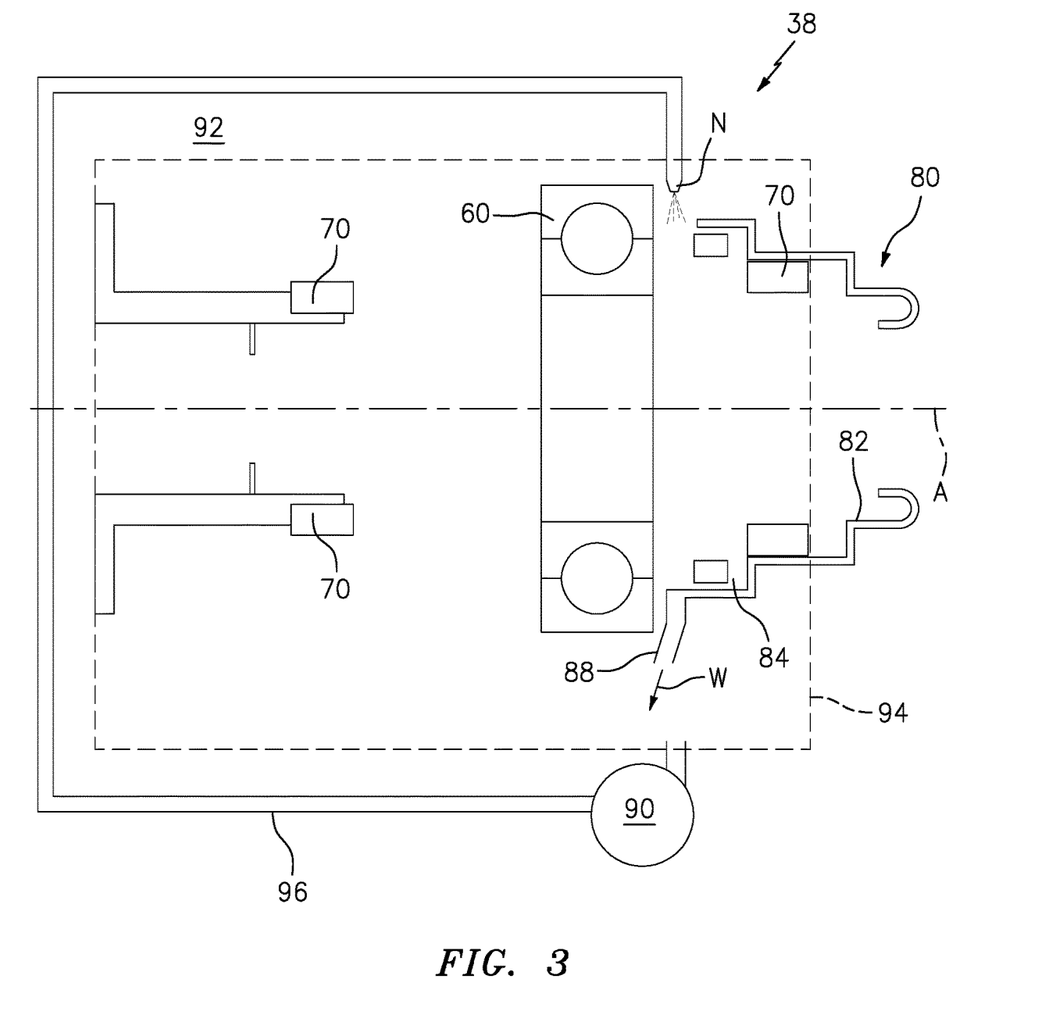
FIG. 3 is a schematic view of an oil flow path for a bearing compartment with an oil drainback system.

An oil drainback system 80 of the bearing compartments 38 includes a scupper 82 that collects egressed oil (e.g., weepage from the oil-wetted zone which may occur for a variety of reasons including wear, failures, or operation at undesirable pressures). The scupper 82 is rotationally fixed around axis A and has a gutter section 84 that accumulates and transfers the weeped oil ("w"; FIG. 3) collected in the scupper 82 to an oil passage 86. Thence, the oil is communicated by the oil passage 86 to an oil drain tube assembly 88 for eventual communication back into the oil-wetted zone.

With reference to FIG. 3, oil flow through and around the bearing compartment 38 is schematically illustrated. Oil from other locations within the bearing compartment and/or which has reached the buffer air cavity 92 (e.g., "dry" zone; schematically indicated as the space around oil-wetted zone 94) is collected via the oil drainback system 80. This oil can be collected, for example by centripetal force and gravity, in the scupper 82, then flowed at pressure typically influenced by pressure in the buffer air cavity 92, to the oil drainback system 80. Oil and air are typically exposed to the higher pressure which is typically present in the buffer air cavity 92. A pump 90 scavenges oil from the oil-wetted zone 94 which can then be introduced back into the oil-wetted zone 94 through a flow passage 96 via spray nozzles N and the like.

Figure 4:
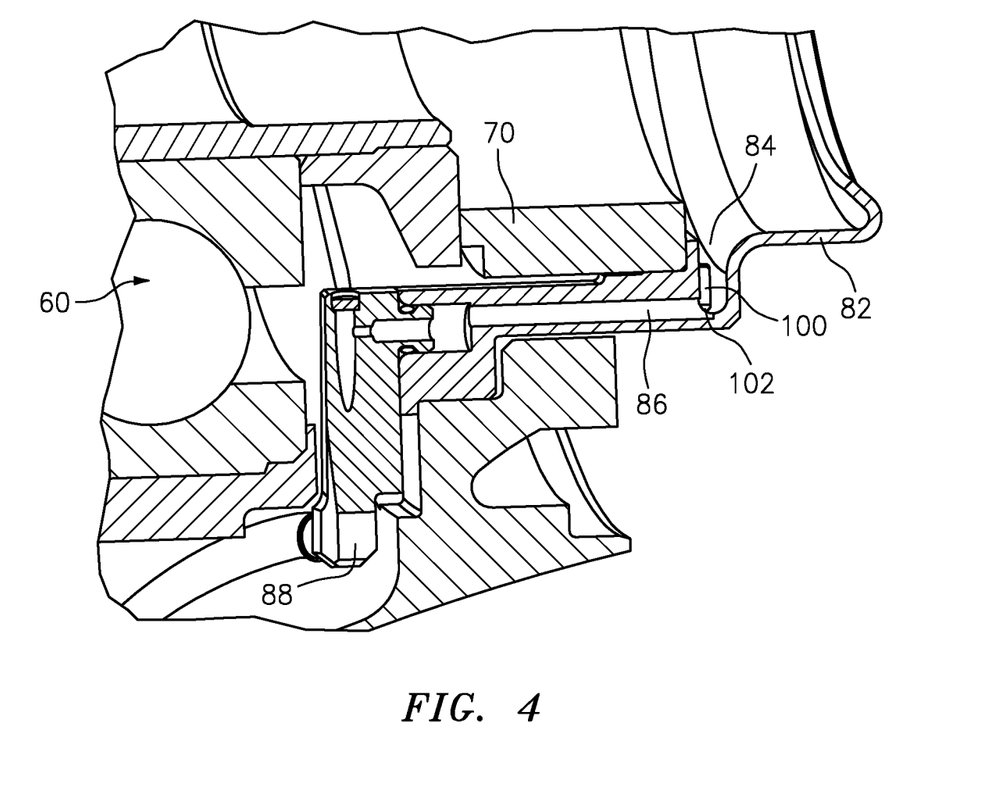
FIG. 4 is an expanded sectional view of the oil drainback system of FIG. 2.
Figure 5:
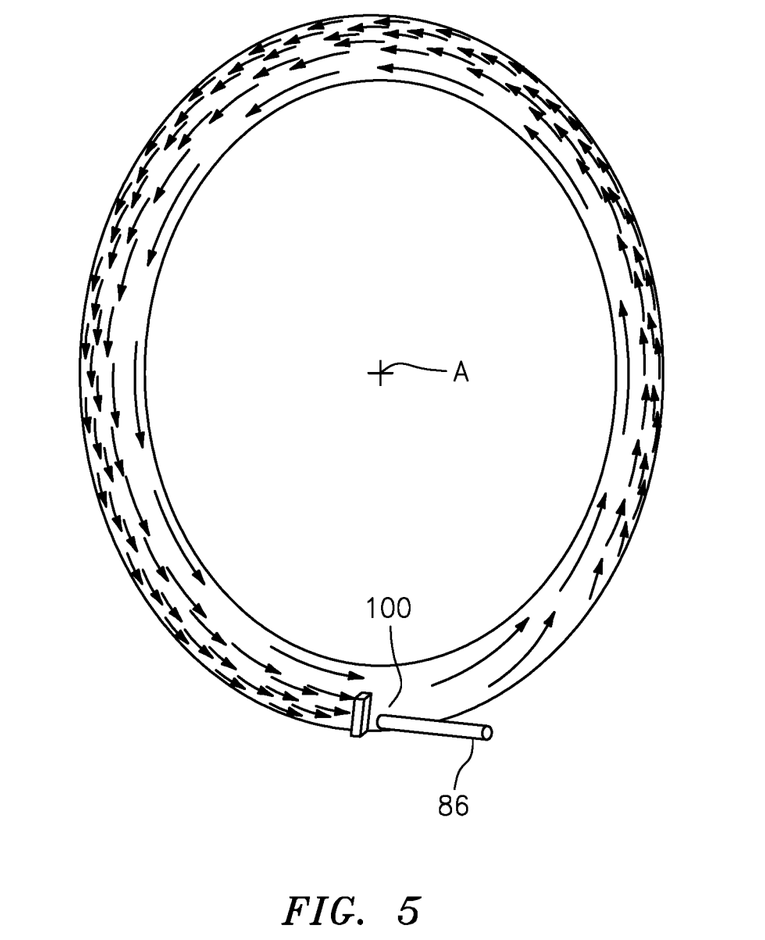
FIG. 5 is a schematic view of an oil flow path gutter oil concentration in which windage forces are generated in a gutter section.

With reference to FIG. 4, the scupper 82 collects egressed oil from the seal 70 before the oil reaches the engine flow path and ultimately the customer bleed. Due to the close proximity of the high rotor to the scupper 82, and the high speed of the high rotor, the windage that occurs within the gutter section can be high. The high velocity flow within the scupper 82 can interfere with proper scavenging and flow of oil. Once oil is captured within the main body of the scupper 82, it flows down into the gutter section 84 which extends 360 degrees circumferentially around the seal support. Due to the high windage (FIG. 5) that occurs within the gutter section 84, a windage blocker 100 is used to remove the energy from the oil and promote drainage into a drain hole 102 in the gutter section 84. The drain hole 102 (perpendicular to the tangential direction of oil movement due to windage) communicates with the oil drain tube assembly 88.

Figure 6:
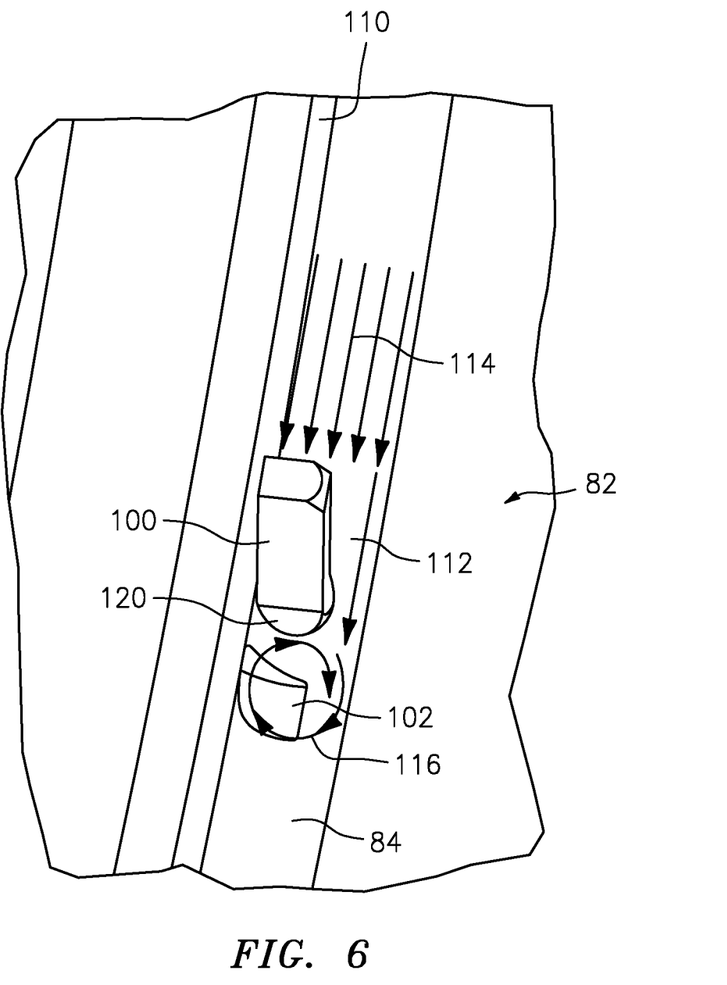
FIG. 6 is an expanded view of a windage blocker baffle for the oil drainback system according to one embodiment illustrating oil concentration regions.

With reference to FIG. 6, the windage blocker 100 is located just upstream of the drain hole 102. The windage blocker 100 is positioned on the same side wall 110 as the drain hole 102 to leave a passage space 112 of 25%-30% the total width of the gutter section 84 to allow a percentage of oil pass through. In one example, the gutter section 84 is about 0.7 inches (17.8 mm) wide.

The windage blocker 100 is upstream of the drain hole 102 by a distance equivalent to a width of the windage blocker 100. The windage blocker 100 increases the pressure (illustrated schematically at 114) in front of the windage blocker 100 and generates a vortex (illustrated schematically at 116) just downstream which creates an oil re-circulation zone and promotes oil drainage down the drain hole 102. In other words, pressure is increased in front of the windage blocker 100, causing a restriction through the passage 112 and creating a "calm" recirculation zone just downstream of the windage blocker 100. The vortex creates both a calming area for oil to pool and build head pressure to drain down the drain hole 102 as well as generate some pumping action due to the direction of rotation of the recirculation zone (vortex). The oil concentration circumferentially around the gutter section changes due to the presence of the windage blocker 100.

Figure 7:
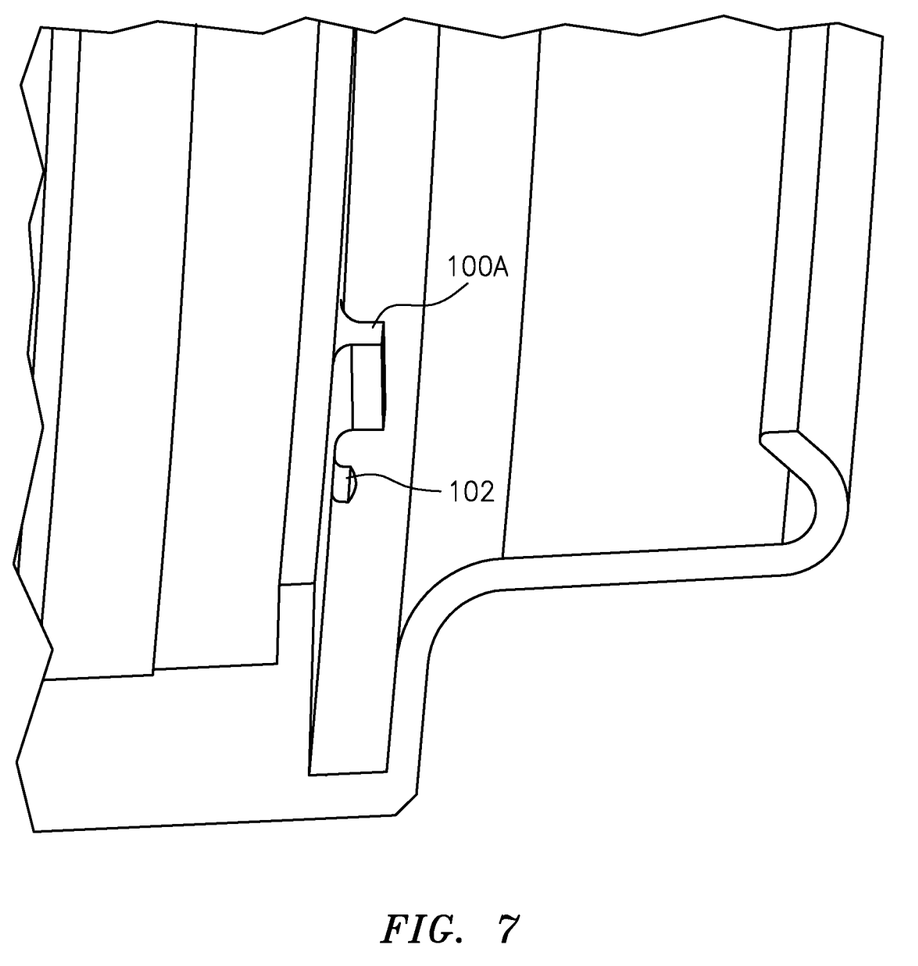
FIG. 7 is an expanded view of a windage blocker baffle for the oil drainback system according to another embodiment.

In this embodiment, the windage blocker 100 is a separately machined pin that is then pressed into a corresponding aperture 120 in the wall 110 of the gutter section 84. In another embodiment, the windage blocker 100A is machined into a wall of the gutter section 84 (FIG. 7).

The windage blocker may include rotating and static hardware to direct the oil to a benign area as well as ducting, or similar features, to return the oil without adding risk to the baseline compartment functionality. The windage blocker allows for the oil that is captured in the gutter section of the scupper to be efficiently drained back into the bearing compartment. Without the windage blocker the windage would likely be high enough that a significant head would build within the gutter section for oil to effectively drain down the drain hole. The high head required to drain oil in this scenario may otherwise increase the probability that oil escapes the scupper and enters the engine gas path. The windage blocker reduces the operating head within the gutter section by taking energy out of the oil and facilitates efficient drain.

Although the different non-limiting embodiments have specific illustrated components, the embodiments are not limited to those particular combinations. It is possible to use some of the components or features from any of the non-limiting embodiments in combination with features or components from any of the other non-limiting embodiments.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An oil drainback system suitable for a bearing compartment of a gas turbine engine comprising:
a scupper defined about an engine longitudinal axis;
a gutter section formed in the scupper, the gutter section having a drain hole; and
a windage blocker in the gutter section upstream of and circumferentially aligned with the drain hole with respect to windage in the gutter section, the windage blocker extends from a wall of the gutter section;
wherein the windage blocker extends from the wall of the clutter section to define a passage space 25%-30% a total width of the clutter section to allow a percentage of oil pass through.

2. The system as recited in claim 1, wherein the drain hole extends at least partially into the wall of the gutter section.

3. The system as recited in claim 1, wherein the windage blocker is upstream of the drain hole by a distance equivalent to a width of the windage blocker.

4. The system as recited in claim 1, wherein the gutter section is a 360 degree gutter section, and wherein the windage blocker is upstream of the drain hole by 2-5 degrees of the 360 degree gutter section.

5. The system as recited in claim 1, wherein the windage blocker is a pin affixed within an aperture formed in the wall of the gutter section.

6. The system as recited in claim 1, wherein the windage blocker is machined in the wall of the gutter section.

7. A bearing compartment of a gas turbine engine comprising:
a scupper defined about an engine longitudinal axis;
a gutter section formed in the scupper, the gutter section having a drain hole;
a windage blocker in the gutter section upstream of and circumferentially aligned with the drain hole with respect to windage in the gutter section, the windage blocker extends from a wall of the gutter section; and
an oil drain tube assembly in communication with the drain hole;
wherein the windage blocker extends from the wall of the clutter section to define a passage space 25%-30% a total width of the clutter section to allow a percentage of oil pass through.

8. The bearing compartment as recited in claim 7, wherein the scupper extends aft of a rear bearing of the bearing compartment.

9. The bearing compartment as recited in claim 8, further comprising a seal assembly within the scupper.

10. The bearing compartment as recited in claim 9, wherein the seal assembly is aft of the rear bearing.

11. The bearing compartment as recited in claim 7, wherein the oil drain tube assembly is located at bottom dead center of the gutter section.

12. The bearing compartment as recited in claim 2, wherein the windage blocker is upstream of the drain hole by a distance equivalent to a width of the windage blocker.

13. The bearing compartment as recited in claim 7, wherein the gutter section is a 360 degree gutter section, and wherein the windage blocker is upstream of the drain hole by 2-5 degrees of the 360 degree gutter section.

14. A method for capturing wept oil in a bearing compartment of a gas turbine engine comprising a scupper defined about an engine longitudinal axis; a gutter section formed in the scupper, the gutter section having a drain hole; and a windage blocker in the gutter section, the method comprising:
positioning the windage blocker adjacent to, upstream of and circumferentially aligned with the drain hole forming a passage space for increasing a pressure upstream of the windage blocker and generating a vortex downstream of the windage blocker so as to create an oil re-circulation zone promoting oil drainage into the drain hole;

wherein the windage blocker extends from the wall of the clutter section to define a passage space 25%-30% a total width of the clutter section to allow a percentage of oil pass through.

15. The method as recited in claim 14, further comprising positioning the windage blocker to extend from a wall in a gutter section, the drain hole positioned at least partially on the wall.

16. The method as recited in claim 14, further comprising creating both a calming area for oil to pool and build head pressure for the oil to drain down the drain hole as well as a pumping action due to the direction of rotation of the recirculation zone.

17. The method as recited in claim 14, further comprising changing an oil concentration circumferentially around the gutter section due to the presence of the windage blocker.

* * * * *